Patented June 9, 1925.

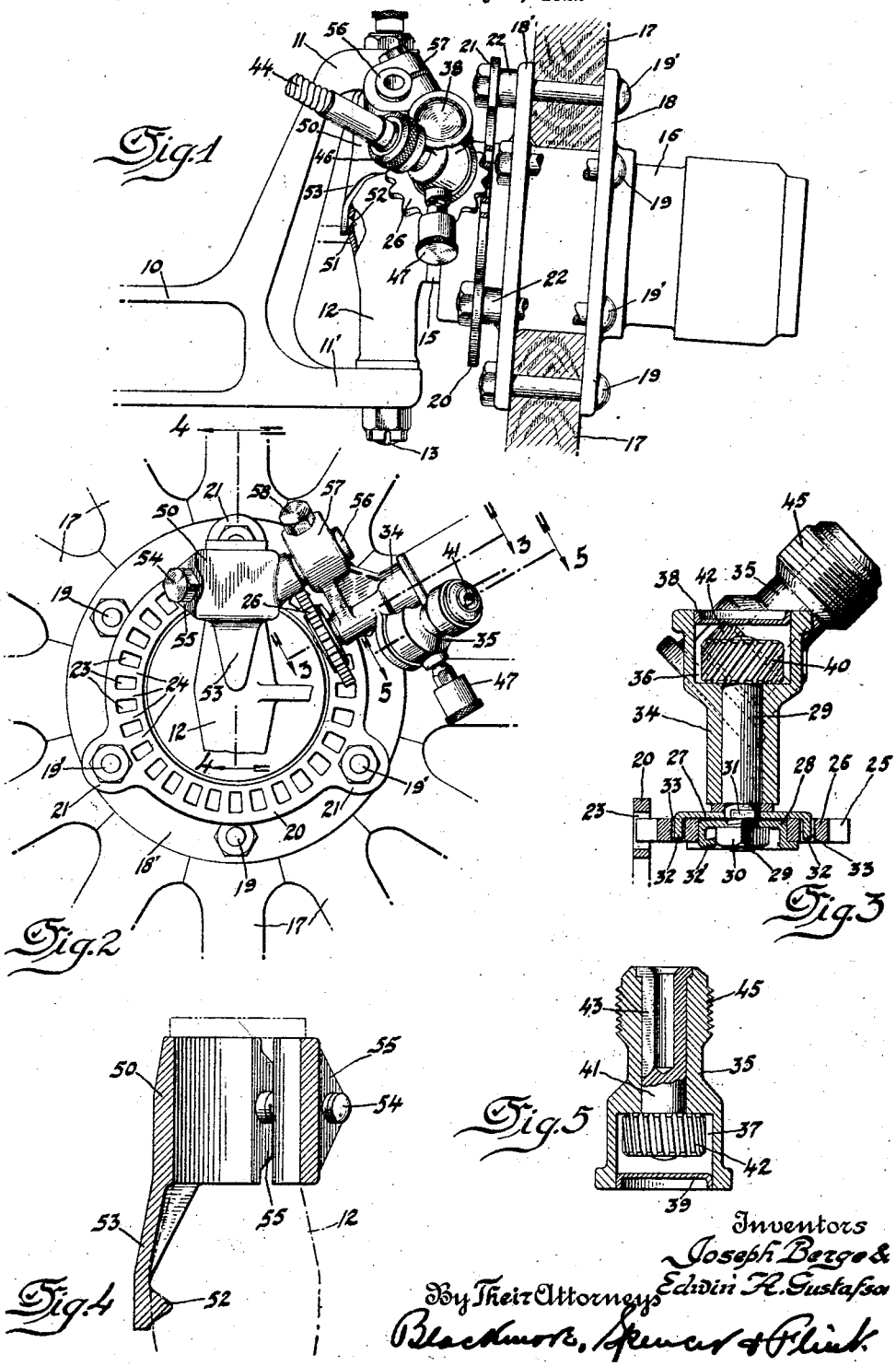

1,541,468

UNITED STATES PATENT OFFICE.

JOSEPH BERGE AND EDWIN A. GUSTAFSON, OF FLINT, MICHIGAN, ASSIGNORS TO A C SPARK PLUG COMPANY, OF FLINT, MICHIGAN, A CORPORATION OF MICHIGAN.

SPEEDOMETER-DRIVING MECHANISM.

Application filed May 8, 1922. Serial No. 559,213.

*To all whom it may concern:*

Be it known that we, JOSEPH BERGE, a citizen of the United States, and EDWIN A. GUSTAFSON, a subject of the King of Sweden, and residents of Flint, county of Genesee, and State of Michigan, have invented certain new and useful Improvements in Speedometer-Driving Mechanism, of which the following is a full, clear, concise, and exact description, such as will enable others skilled in the art to which the invention relates to make and use the same, reference being made therein to the accompanying drawings, which form a part of this specification.

The invention relates generically to means for actuating a rotatable element by power derived from one of the dirigible wheels of a vehicle, and is more particularly concerned with the transmission of motion from one of the front wheels of a motor vehicle to a flexible shaft adapted to actuate a speedometer or the like. While in many respects of more general application, the invention is especially designed for use in connection with the front wheel and steering knuckle of a Ford car.

The objects of the invention include the following:

The provision of improved means readily applicable to existing forms of wheels and steering knuckles without any modification of said parts to support speedometer actuating mechanism.

The provision of speedometer driving mechanism applicable to a dirigible road wheel and including means permitting easy change in the ratio of speed of the driving and driven elements to accommodate the mechanism to road wheels of different diameters.

The provision of improved driving mechanism comprising driving and driven gear elements of extremely simple and highly efficient construction.

Further objects and advantages will appear from the following description taken in connection with the accompanying drawings, in which Fig. 1 is a rear elevation of one embodiment of the invention shown as associated with a wheel and steering knuckle of the type used on certain of the Ford cars;

Fig. 2 is a side elevation of the structure shown in Fig. 1, looking outwardly, the yoke and part of the knuckle being broken away; and Figs. 3, 4 and 5 are sections taken on lines 3—3, 4—4, and 5—5, respectively, of Fig. 2.

Referring to the drawings, 10 indicates an axle having at its extremity a yoke comprising arms 11, 11'. A steering knuckle 12 is rotatably mounted between the arms 11, 11', upon a pin 13. A spindle 15 projecting from the knuckle 12 carries a road wheel 16, which, as well as the parts already described, may be of any usual or suitable character.

The road wheel shown comprises spokes 17 and hub plates or flanges 18, 18', secured together by bolts 19, 19'. A flat ring gear 20 is supported upon the bolts 19', perforated ears 21 being provided on the gear which fit over the inner ends of the bolts and are spaced from the hub flange 18' by washers 22. The bolts 19' are substituted for the usual clamping bolts, such as 19, and serve the purpose of clamping the hub flanges together, as well as supporting the ring gear 20. It will be noted that this is the only change made in the usual details of vehicle construction in order to adapt it to the use of our invention, and while it is considered preferable, because of its convenience and simplicity, to utilize this method of mounting the ring gear, it will be understood that the gear may be supported by other means if desired.

The ring gear 20 comprises an annulus which may be of sheet metal provided with a series of perforations 23, the bars 24 between the perforations serving as teeth in cooperation with the teeth 25 of a toothed gear 26 mounted in a plane perpendicular to the plane of the gear 20. The latter gear, being constituted merely of a flat perforated ring, may be manufactured very easily and cheaply from sheet material by simple stamping and punching operations, and therefore is peculiarly suitable for quantity production under circumstances where time of manufacture and cost of labor and materials are important factors.

The portions of gear 26 which engage with gear 20 are formed preferably from a non-sonorous and wear-resisting material, such, for example, as one of the fiber compositions ordinarily employed in like situations. This material may constitute a toothed ring which is clamped between a disk or washer 27 and a flanged cup washer 28, both of which are secured together and to the end of a shaft 29 by a nut 30. The end of the shaft may be irregularly shaped or flattened, as indicated at 31, to engage the washer 27 and provide a driving engagement between the shaft and the washer. Lugs 32 struck up from the edges of the washer engage in holes 33 in the toothed ring to provide driving connection between the washer and the ring. A lug 32' may also be provided on washer 28 which is bent inwardly to engage one of the faces of nut 30 and lock the same.

The shaft 29 is mounted in a suitable bearing in a gear housing or frame member comprising two tubular parts 34, 35, the axes of which extend at an angle of about 135° to each other. These parts may be formed integrally with each other and are enlarged at their point of union to provide communicating chambers 36, 37, the outer ends of which may be closed by sealing plugs 38, 39, respectively. The end of shaft 29 remote from gear 26 extends into chamber 36 and has secured thereto a gear 40. In the bore of part 35 is journaled a second shaft 41 the inner end of which extends into the chamber 37 and has secured thereto a gear 42. The gear 42 engages with gear 40, the teeth of one or both gears being spiral in order to mesh properly, inasmuch as the axes of the gears are not parallel. The outer end of shaft 41 is suitably formed, as with an irregularly shaped opening or keyway 43, to provide means for driving a flexible shaft 44, which latter may extend to a point on the vehicle convenient for the location of a speedometer, as to the dash. The outer end of the casing element 35 may be provided with screw threads as at 45 to cooperate with a screw collar 46 whereby the flexible shaft is held in proper position with reference to the shaft 41. Lubrication may be provided for by mounting a grease cup 47 upon the casing member 35.

The arrangement of shafts 41, 29, at an angle to each other, as shown, enables the shaft 41 to be positioned substantially in alignment with the direction which the flexible shaft should assume normally in order to transmit motion most easily to the speedometer, thus reducing considerably the deflection of the shaft and resultant wear. The use of the two gears 40, 42, also enables the speed ratio between the road wheel and the speedometer to be varied by mere substitution of pairs of gears with different gear ratios. The compensation for various diameters of road wheels may therefore be readily effected without change in the speedometer itself and with no modification in the driving mechanism except the insertion of a pair of gears having the necessary gear ratio, which gears may be provided, of course, for each standard diameter of road wheel.

In order to support the transmission elements above described and to position the gear 26 in proper relation to the driving gear 20, we have devised a novel structure adapted to be secured upon the steering knuckle. This structure comprises a split sleeve 50 adapted to fit upon the upper and generally approximately cylindrical portion of the knuckle 12, the sleeve terminating slightly below the upper end of the knuckle. In the manufacture of knuckles for the Ford car it is customary to form a centering aperture in the side of the knuckle opposite the wheel spindle as indicated at 51. We utilize this aperture to position the sleeve 50 both longitudinally and angularly by providing a lug 52 upon an arm 53 forming a part of the sleeve, the lug being adapted to enter the aperture 51. A screw or bolt 54 passing through ears 55 serves to clamp the sleeve upon the knuckle. The sleeve terminates preferably somewhat below the upper end of the knuckle, as shown.

Upon one side of the clamping sleeve 50 is formed a cylindrical post 56 adapted to fit within a split sleeve 57 integrally or otherwise rigidly connected to the gear housing or frame 34, 35. A bolt 58 serves to clamp the sleeve upon the post 56. The position of the post is such that the angular adjustment of the gear housing about the post will adjust the gear 26 to or from the driving gear 20, thus providing for proper coordination of these gears.

The bracket comprising the clamp 50 and post 56 may be readily applied and the drive mechanism supported thereby may then be attached or removed at will. Although this bracket is especially designed to fit upon the Ford steering knuckles now in use, it will be understood that the invention may be utilized, with slight modification where necessary, in connection with other makes of automobiles.

It will be noted that the driving gear 20 is self-cleaning inasmuch as the teeth of the fiber gear 26 will tend to remove mud and dirt from the perforations and the gear is spaced from the road wheel sufficiently to permit the dirt to escape. The fact that the teeth constituted by the bars between the perforations are supported at both ends, enables the gear to be formed from much thinner stock than would otherwise be possible without sacrificing strength, thus affording a saving both in material and cost of manufacture. The use of a flat or crown gear for the driving gear makes it possible to mount the driven gear in a plane perpendicular to the road wheel, thus eliminating the necessity of a swivel joint in the transmission connections and enabling the driving mechanism to be made more compact by reducing the pitch circle of the driving gear and mounting the driven gear close to the axle.

It will be understood that various changes may be made without departing from the spirit and scope of the invention and therefore we do not desire to be restricted to the specific features herein set forth except as may be required by the language of the appended claims in view of the prior art.

We claim:

1. In a speedometer driving mechanism, the combination with a vehicle wheel having hub flanges and bolts for securing said flanges together, certain of said bolts being extended beyond said flanges, of a ring gear comprising an annular flat plate having perforations therethrough adapted to receive the teeth of a cooperating toothed gear, said plate provided with lugs adapted to engage said extended bolts and be secured thereto, and a driven gear supported upon the steering knuckle of the vehicle wheel and adjustable in a plane perpendicular to the plane of the said plate.

2. In a speedometer driving mechanism, the combination with a vehicle wheel of a driving gear comprising a flat sheet metal ring with an annular series of perforations, said ring secured to said wheel in a plane parallel to the plane of the wheel, a bracket clamped upon the steering knuckle of the wheel, a gear housing mounted upon said bracket to swing in a plane perpendicular to the plane of the wheel, a driven gear of non-metallic material carried by said housing and adjustable by swinging movement thereof toward or away from said ring gear, and speedometer driving gears enclosed in said housing and arranged to be actuated by said driven gear.

3. In a speedometer driving mechanism, gearing adapted to be driven by a vehicle road wheel and to transmit motion to a flexible shaft, and means for supporting one of the gears of said gearing comprising a bracket adapted to be clamped upon a steering knuckle of a vehicle between the bearings thereof and provided with a post inclined appreciably in respect to the axis of said knuckle, and means for mounting said gear adjustably upon said post.

4. In a speedometer driving mechanism, a supporting bracket adapted to be mounted upon a steering knuckle of a vehicle and comprising a sleeve adapted to surround the knuckle and be clamped thereto, and means for positioning said sleeve on said knuckle.

5. In combination with a vehicle having a steering knuckle and wheel spindle construction wherein the steering knuckle is apertured centrally on the side opposite the spindle, a bracket having an element entering said aperture and positioned thereby, and means carried by said bracket for driving a travel indicator from a wheel on the spindle.

In testimony whereof we affix our signatures.

JOSEPH BERGE.
EDWIN A. GUSTAFSON.